(12) United States Patent
Iyama et al.

(10) Patent No.: US 11,114,810 B2
(45) Date of Patent: Sep. 7, 2021

(54) LASER DEVICE

(71) Applicant: HAMAMATSU PHOTONICS K.K., Hamamatsu (JP)

(72) Inventors: Koichi Iyama, Osaka (JP); Yasuki Takeuchi, Hamamatsu (JP); Yuma Hatano, Hamamatsu (JP); Takaaki Morita, Hamamatsu (JP); Takuto Iguchi, Hamamatsu (JP); Yoshinori Kato, Hamamatsu (JP); Takashi Sekine, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 0 days.

(21) Appl. No.: 16/424,709

(22) Filed: May 29, 2019

(65) Prior Publication Data
US 2019/0372296 A1 Dec. 5, 2019

(30) Foreign Application Priority Data
May 30, 2018 (JP) .............................. JP2018-103634

(51) Int. Cl.
*H01S 3/04* (2006.01)
*H01S 3/02* (2006.01)
(Continued)

(52) U.S. Cl.
CPC ............ *H01S 3/0407* (2013.01); *H01S 3/025* (2013.01); *H01S 3/042* (2013.01); *H01S 3/0621* (2013.01);
(Continued)

(58) Field of Classification Search
CPC ............... H01S 3/0407; H01S 3/10092; H01S 3/10007; H01S 3/08059; H01S 3/07;
(Continued)

(56) References Cited

U.S. PATENT DOCUMENTS

2004/0226695 A1* 11/2004 Bolle ...................... F28D 15/06
165/104.21
2005/0175057 A1* 8/2005 Sumida ................. H01S 3/2383
372/68

(Continued)

FOREIGN PATENT DOCUMENTS

EP 2182598 A2 1/2014
EP 3261196 A1 12/2017
(Continued)

OTHER PUBLICATIONS

Communication pursuant to Article 94(3) EPC dated Jun. 25, 2021 in European Patent Application No. 19 176 946.2.

*Primary Examiner* — Yuanda Zhang
(74) *Attorney, Agent, or Firm* — Faegre Drinker Biddle & Reath LLP (57) ABSTRACT

A laser device includes a first laser medium and a second laser medium that have a first surface and a second surface opposite to the first surface, and receive input of excitation light and seed light from the first surface side to amplify the seed light, a holder that holds the first laser medium and the second laser medium; and a pair of cooling units that cool the first laser medium and the second laser medium according to change in volume of a refrigerant.

6 Claims, 10 Drawing Sheets

(51) Int. Cl.
*H01S 3/042* (2006.01)
*H01S 3/07* (2006.01)
*H01S 3/08* (2006.01)
*H01S 3/10* (2006.01)
*H01S 3/06* (2006.01)
*H01S 3/23* (2006.01)
*H01S 3/16* (2006.01)

(52) U.S. Cl.
CPC ............ *H01S 3/07* (2013.01); *H01S 3/08059* (2013.01); *H01S 3/10007* (2013.01); *H01S 3/10092* (2013.01); *H01S 3/2316* (2013.01); *H01S 3/1643* (2013.01)

(58) Field of Classification Search
CPC ........ H01S 3/042; H01S 3/025; H01S 3/0404; H01S 3/0405; H01S 3/2316; H01S 2301/02; H01S 3/2333; H01S 3/1643; H01S 3/1618; H01S 3/0621; H01S 3/0604
See application file for complete search history.

(56) References Cited

U.S. PATENT DOCUMENTS

| | | | | |
|---|---|---|---|---|
| 2008/0247432 A1* | 10/2008 | Miyajima | ............... | H01S 5/024 372/35 |
| 2010/0111121 A1* | 5/2010 | Takeshita | .............. | H01S 3/0604 372/29.01 |
| 2014/0016658 A1 | 1/2014 | Galasso et al. | | |
| 2017/0254574 A1* | 9/2017 | Kim | ........................ | F25B 49/02 |
| 2018/0145474 A1* | 5/2018 | Kondo | .................... | H01S 3/042 |

FOREIGN PATENT DOCUMENTS

| | | | |
|---|---|---|---|
| JP | H09-312430 | A | 12/1997 |
| JP | 2005-327857 | A | 11/2005 |
| JP | 2006-237170 | A | 9/2006 |
| JP | 2014-022568 | A | 2/2014 |
| JP | 2017-216387 | A | 12/2017 |
| WO | WO 2017/064881 | A1 | 4/2017 |
| WO | WO-2018/147231 | A1 | 8/2018 |

\* cited by examiner

| AMOUNT OF ROTATION (DEGREE) | AMOUNT OF MOVEMENT (mm) |
| --- | --- |
| -4 | -34.6 |
| -3 | -25.8 |
| -2 | -17.1 |
| -1 | -8.5 |
| 0 | 0.0 |
| 1 | 8.4 |
| 2 | 16.8 |
| 3 | 25.0 |
| 4 | 33.1 |

| AMOUNT OF ROTATION (DEGREE) | AMOUNT OF MOVEMENT (mm) |
|---|---|
| -4 | -39.6 |
| -3 | -29.7 |
| -2 | -19.8 |
| -1 | -9.9 |
| 0 | 0.0 |
| 1 | 9.9 |
| 2 | 19.8 |
| 3 | 29.7 |
| 4 | 39.6 |

| AMOUNT OF ROTATION (DEGREE) | AMOUNT OF MOVEMENT (mm) |
|---:|---:|
| -4 | -2.00 |
| -3 | -1.13 |
| -2 | -0.50 |
| -1 | -0.13 |
| 0 | 0.00 |
| 1 | -0.13 |
| 2 | -0.50 |
| 3 | -1.13 |
| 4 | -2.00 |

LASER DEVICE

TECHNICAL FIELD

The present disclosure relates to a laser device.

BACKGROUND

A laser device is described in Japanese Unexamined Patent Publication No. 2005-327857. This laser device includes a resonance type laser amplifier, and a path type laser light amplifier (multipath amplifier) for further amplifying laser light amplified by the resonance type laser amplifier. The path type laser light amplifier includes a laser medium and six reflective plates that form optical paths of laser light. The optical paths formed by the reflective plates are all configured to pass through the laser medium. Laser light from the resonance type laser amplifier is reflected by reflective plates one after another such that the laser light passes through a number of optical paths and is output. The laser light passes through the laser medium each time the laser light passes through these optical paths. The laser light is amplified each time the laser light passes through the laser medium.

SUMMARY

Incidentally, in the laser device as described above, for example, it is conceivable to adopt low temperature cooling Yb:YAG as a laser medium. In this case, for example, it is desirable to cool the laser medium to 100 K or less in order to improve gain characteristics of the laser medium. For cooling of the laser medium, for example, a refrigerator using a Gifford McMahon cycle can be used. In this refrigerator, vibration due to compression and expansion of the refrigerant is generated. Therefore, there is concern that vibration may be generated in the laser medium due to transmission of the vibration in the refrigerator to the laser medium. When laser light that is an amplification target is transmitted through and reflected by the vibrating laser medium, a direction and position of the amplified laser light emitted from the laser medium are changed, and accuracy of optical path control is degraded.

An object of the present disclosure is to provide a laser device capable of suppressing degradation of accuracy of optical path control while improving gain characteristics by cooling.

A laser device includes a first laser medium and a second laser medium that have a first surface and a second surface opposite to the first surface, and receive input of excitation light and seed light from the first surface side to amplify the seed light; a holder that holds the first laser medium and the second laser medium; and a pair of cooling units that cool the first laser medium and the second laser medium according to change in volume of a refrigerant, wherein a first mirror that reflects at least the seed light is provided on the second surface, the first laser medium and the second laser medium are disposed at relative positions in which the seed light reflected by the first mirror of the first laser medium is further reflected by the first mirror of the second laser medium, and the holder integrally holds the first laser medium and the second laser medium so that the relative position is maintained.

In this laser device, the first laser medium and the second laser medium that receive the input of the excitation light and amplify the seed light are each cooled by the cooling unit. Therefore, gain characteristics can be improved. On the other hand, the cooling unit uses change in volume of the refrigerant. Therefore, there is concern that the first laser medium and the second laser medium may vibrate due to vibration due to the change in volume of the refrigerant. In the laser device, the first laser medium and the second laser medium are integrally held by the holder so that relative positions of the first mirrors are maintained. Therefore, the vibration of the first laser medium and the vibration of the second laser medium, including directions or phases thereof, are synchronized. As a result, a displacement of the incidence angle and the reflection angle of the seed light at the first mirror of the first laser medium due to the vibration is compensated for by a displacement of the incidence angle and the reflection angle of the seed light at the first mirror of the second laser medium due to the vibration, and variation in a direction or a position of the seed light to be output are suppressed. Accordingly, according to the laser device, degradation of accuracy of the optical path control is suppressed.

In the laser device, the first laser medium and the second laser medium may be disposed such that the first mirrors are parallel to each other. In this case, it is possible to reliably compensate for the displacement of the incidence angle and the reflection angle of the seed light at the mirror of the first laser medium due to the vibration using the displacement of the incidence angle and the reflection angle of the seed light at the first mirror of the second laser medium due to the vibration, and further suppress a variation in the direction or the position of the seed light to be output.

The laser device may include a second mirror that reflects the seed light reflected by the first mirror of the second laser medium so that the seed light is incident on the first mirror of the second laser medium at an incidence angle equal to a reflection angle of the seed light on the first mirror of the second laser medium. In this case, the seed light passes through the first laser medium and the second laser medium, and then, passes through the second laser medium and the first laser medium again at the same incidence angle and reflection angle. In this case, it is possible to substantially eliminate a shift between the incidence position and the emission position of the seed light.

In the laser device, the holder may include a placement portion in which the first laser medium and the second laser medium are placed on a placement surface that is along an optical path of the seed light; and a holding portion that is provided integrally with the placement portion to protrude from the placement surface, and holds the first laser medium and the second laser medium so that the relative position is maintained. In this case, the relative positions of the first laser medium and the second laser medium can be reliably maintained.

In the laser device, the first laser medium and the second laser medium may be thermally connected to the cooling unit via a flexible heat conductive member. In this case, vibration transmitted from the cooling unit to the first laser medium and the second laser medium can be reduced.

In the laser device, the cooling unit may be a refrigerator that cools the first laser medium and the second laser medium according to periodic compression and expansion of the refrigerant. Thus, the above configuration is particularly effective when a refrigerator in which periodic vibration can be generated is used.

According to the present disclosure, it is possible to provide a laser device capable of suppressing degradation of accuracy of optical path control while improving gain characteristics by cooling.

DETAILED DESCRIPTION

Hereinafter, an embodiment will be described in detail with reference to the drawings. In the drawings, the same elements or corresponding elements may be denoted by the same reference numerals, and redundant description may be omitted.

Figure 1:
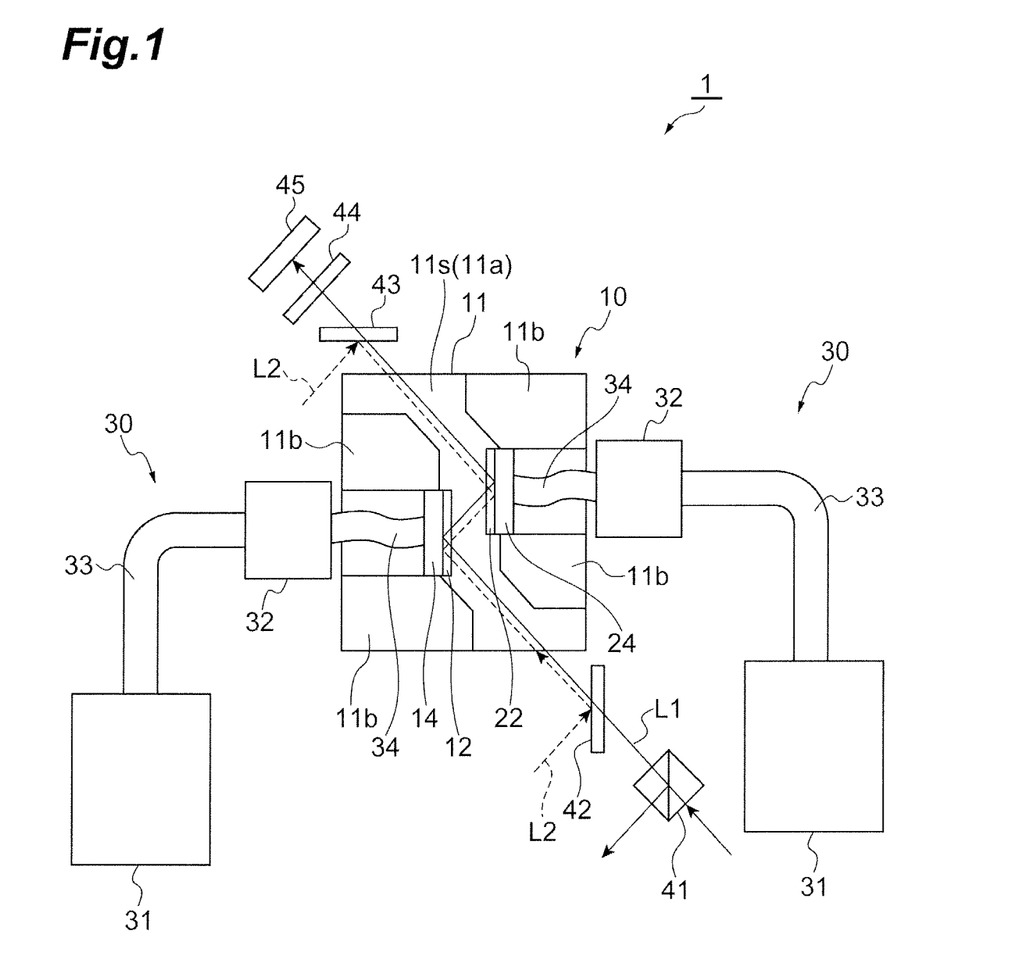
FIG. 1 is a schematic diagram illustrating an entire configuration of a laser device according to an embodiment of the present invention.
Figure 2:
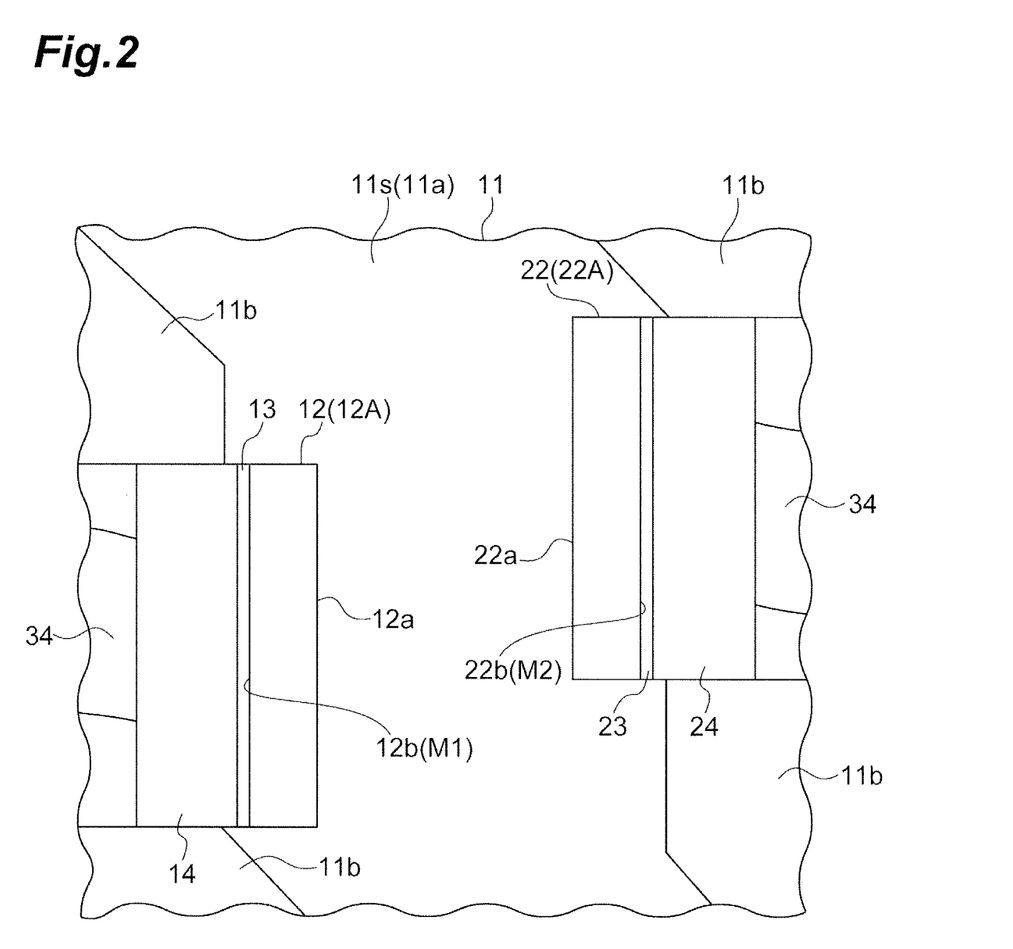
FIG. 2 is an enlarged view of main parts of FIG. 1.

FIG. 1 is a schematic diagram illustrating an entire configuration of a laser device according to the embodiment. FIG. 2 is an enlarged view of main parts of FIG. 1. As illustrated in FIGS. 1 and 2, a laser device 1 includes an amplification unit 10 and a pair of cooling units 30. The amplification unit 10 includes a holder 11, a first laser medium 12, and a second laser medium 22. The holder 11 holds the first laser medium 12 and the second laser medium 22. The cooling unit 30 cools each of the first laser medium 12 and the second laser medium 22.

The first laser medium 12 includes a first surface 12a and a second surface 12b opposite to the first surface 12a. The first laser medium 12 receives seed light L1 and an input of excitation light L2 from the first surface 12a side, and amplifies the seed light L1. The second laser medium 22 includes a first surface 22a and a second surface 22b opposite to the first surface 22a. The second laser medium 22 receives the seed light L1 and an input of the excitation light L2 from the first surface 22a side and amplifies the seed light L1. The seed light L1 is, for example, laser light having a wavelength of about 1030 nm. The excitation light L2 is, for example, a laser light having a wavelength different from that of the seed light L1, which is a wavelength of about 940 nm.

The first laser medium 12 includes, for example, a flat gain medium 12A. The first surface 12a and the second surface 12b are a front surface and a back surface of the gain medium 12A. The second laser medium 22 includes, for example, a flat gain medium 22A. The first surface 22a and the second surface 22b are a front surface and a back surface of the gain medium 22A. The gain media 12A and 22A are, for example, laser gain media including Yb as an active element (for example, Yb:YAG).

A reflective film 13 is formed on the second surface 12b of the first laser medium 12 (the gain medium 12A). The reflective film 13 is, for example, a dielectric multilayer film that reflects the seed light L1 and the excitation light L2. Accordingly, a mirror (a first mirror) M1 that reflects the seed light L1 and the excitation light L2 is formed on the second surface 12b. That is, the first laser medium 12 includes a mirror M1. The first laser medium 12 having the gain medium 12A and mirror M1 may also be referred to as a first laser medium unit. Further, a reflective film 23 is formed on the second surface 22b of the second laser medium 22 (the gain medium 22A). The reflective film 23 is, for example, a dielectric multilayer film that reflects the seed light L1 and the excitation light L2. Accordingly, a mirror (a first mirror) M2 that reflects the seed light L1 and the excitation light L2 is formed on the second surface 22b. That is, the second laser medium 22 includes a mirror M2. The second laser medium 22 having the gain medium 22A and mirror M2 may also be referred to as a second laser medium unit.

Further, a heat sink 14 is provided on the second surface 12b of the first laser medium 12 through the reflective film 13. That is, the first laser medium 12 (the gain medium 12A) is thermally connected to the heat sink 14. Further, a heat sink 24 is provided on the second surface 22b of the second laser medium 22 through the reflective film 23. That is, the second laser medium 22 (the gain medium 22A) is thermally connected to the heat sink 24. Here, the holder 11 holds the heat sinks 14 and 24, thereby holding the first laser medium 12 and the second laser medium 22.

The cooling unit 30 cools the first laser medium 12 (the gain medium 12A) and the second laser medium 22 (the gain medium 22A) according to change in volume of the refrigerant (for example, nitrogen or helium). The change in volume of the refrigerant includes, for example, change in volume due to phase transition of the refrigerant such as expansion and compression between a gas and liquid, and change in volume (for example, of a refrigerant gas) not accompanied by at least a part of phase transition. Here, the cooling unit 30 is a refrigerator that cools the first laser medium 12 and the second laser medium 22 according to periodic compression and expansion of the refrigerant.

Examples of the refrigerator may include a Stirling refrigerator using a Stirling cycle and a Gifford McMahon refrigerator using a Gifford McMahon cycle. More specifically, the cooling unit 30 includes a compressor 31, a cold head 32, and a pipe 33, as illustrated in FIG. 1. The compressor 31 compresses a refrigerant gas (for example, a helium gas) through reciprocation of a piston, and supplies the compressed refrigerant gas to the cold head 32 through the pipe 33. The cold head 32 expands the refrigerant gas supplied from the compressor 31 through reciprocation of a displacer in a cylinder to generate cold heat.

The cooling unit 30 is thermally connected to the first laser medium 12 (the gain medium 12A) and the second laser medium 22 (the gain medium 22A) via a flexible heat conductive member 34. The heat conductive member 34 is, for example, a copper mesh wire. The heat conductive member 34 has one end attached to the cold head 32 and the other end attached to the heat sinks 14 and 24. Accordingly, cold heat is provided to the first laser medium 12 and the second laser medium 22 from the second surfaces 12b and 22b, and the first laser medium 12 and the second laser medium 22 are cooled.

Here, the laser device 1 further includes a polarization beam splitter 41, dichroic mirrors 42 and 43, a polarization rotation element (for example, a 214 wavelength plate) 44, and a mirror (a second mirror) 45. In the laser device 1, the seed light L1 is input from the outside through the polarization beam splitter 41. The seed light L1 passing through the polarization beam splitter 41 passes through the dichroic mirror 42 and is input to the amplification unit 10. The seed light L1 input to the amplification unit 10 is first incident on the first laser medium 12 from the first surface 12a side, reflected by the mirror M1 on the second surface 12b side, and emitted from the first surface 12a. Accordingly, the seed light L1 is amplified twice by reciprocating through the gain medium 12A.

The seed light L1 emitted from the first laser medium 12 is incident on the second laser medium 22 from the first surface 22a side, reflected by the mirror M2 on the second surface 22b side, and emitted from the first surface 22a. Accordingly, the seed light L1 is amplified twice by reciprocating through the gain medium 22A. The seed light L1 emitted from the second laser medium 22 is output from the amplification unit 10, passes through the dichroic mirror 43, and is input to the polarization rotation element 44. The seed light L1 input to the polarization rotation element 44 is output after a polarization direction thereof is changed from linear polarization to circular polarization. The seed light L1 output from the polarization rotation element 44 is reflected by the mirror 45 and directed to a path opposite to the above. Here, an angle of incidence of the seed light L1 on the mirror 45 is substantially 0°. That is, the mirror 45 is a 0° mirror.

Therefore, an angle of incidence of the seed light L1 reflected by the mirror 45 on the mirror M2 is substantially equal to an angle of reflection by the mirror M2 of the seed light L1 directed to the mirror 45. That is, the laser device 1 includes the mirror 45 that reflects the seed light L1 reflected by the mirror M2 of the second laser medium 22 so that the seed light L1 is incident on the mirror M2 of the second laser medium 22 at an incidence angle equal to an angle of reflection of the seed light L1 by the mirror M2 of the second laser medium 22.

The seed light L1 reflected by the mirror 45 is input to the polarization rotation element 44. The seed light L1 input to the polarization rotation element 44 is output after a polarization direction thereof is changed from circular polarization to linear polarization. Accordingly, the polarization direction of the seed light L1 is rotated by 90° in total. The seed light L1 output from the polarization rotation element 44 is input to the amplification unit 10 again. The seed light L1 input to the amplification unit 10 is incident on the second laser medium 22 from the first surface 22a side, reflected on the second surface 22b side, and emitted from the first surface 22a. Accordingly, the seed light L1 is amplified twice again by reciprocating through the gain medium 22A.

The seed light L1 emitted from the second laser medium 22 is incident on the first laser medium 12 from the first surface 12a side, reflected on the second surface 12b side, and emitted from the first surface 12a. Accordingly, the seed light L1 is amplified twice more by reciprocating through the gain medium 12A. The seed light L1 emitted from the first laser medium 12 is output from the amplification unit 10, passes through the dichroic mirror 42, and is input to the polarization beam splitter 41. A polarization direction of the seed light L1 in this case is rotated by 90° due to the reciprocation of the polarization rotation element 44.

Therefore, the seed light L1 input to the polarization beam splitter 41 is reflected by the polarization beam splitter 41 and extracted from the laser device 1. The seed light L1 extracted from the laser device 1 is provided to, for example, an amplifier (a main amplifier unit) in a subsequent stage. Accordingly, in this example, the laser device 1 is a preamplifier unit. It should be noted that the excitation light L2 is reflected by the dichroic mirror 42 and the dichroic mirror 43 and input to the amplification unit 10. Here, the excitation light L2 passes through the same path as the seed light L1 between the dichroic mirror 42 and the dichroic mirror 43, that is, in the amplification unit 10.

Next, a relative position of the first laser medium 12 and the second laser medium 22 will be described in detail. As illustrated in FIG. 2, the first laser medium 12 and the second laser medium 22 are disposed at a relative position at which the seed light L1 reflected by the mirror M1 of the first laser medium 12 is further reflected by the mirror M2 of the second laser medium 22. Here, the seed light L1 input to the amplification unit 10 from the polarization beam splitter 41 is incident on the first laser medium 12, reflected by the mirror M1, incident on the second laser medium 22, further reflected by the mirror M2, and output to the mirror 45 from the amplification unit 10, as described above. On the other hand, in the laser device 1, the seed light L1 is reflected (folded) by the mirror 45 and passes through the second laser medium 22 and the first laser medium 12 again.

Therefore, here, the relative position of the first laser medium 12 and the second laser medium 22 can also be said to be a relative position at which the seed light L1 reflected by the mirror M2 of the second laser medium 22 is further reflected by the mirror M1 of the first laser medium 12. Hereinafter, a path of the seed light L1 from the first laser medium 12 to the second laser medium 22 may be referred to as a "forward path", and a path of the seed light L1 from the second laser medium 22 to the first laser medium 12 may be referred to as a "backward path".

The relative position of the first laser medium 12 and the second laser medium 22 may be a relative position such that the number of reflections of each of the mirror M1 and the mirror M2 in each of the forward path and the backward path of the seed light L1 is one (that is, two times in total). Alternatively, the relative position of the first laser medium 12 and the second laser medium 22 may be a relative position such that the number of reflections of each of the mirror M1 and the mirror M2 in each of the forward path and the backward path of the seed light L1 is two (that is, four times in total). The relative position of the first laser medium 12 and the second laser medium 22 can be a relative position such that the numbers of reflections of the mirror M1 and the mirror M2 in the forward path and the backward path of the seed light L1 are equal to each other (that is, a total number of reflections is an even number of times).

It should be noted that, here, the first laser medium 12 and the second laser medium 22 are disposed such that the mirror M1 and the mirror M2 are substantially parallel to each other. Further, here, the first laser medium 12 and the second laser medium 22 are disposed to partially overlap each other when seen in a direction intersecting (orthogonal to) the mirrors M1 and M2. Further, here, in the amplification unit 10, the excitation light L2 also passes through the same path as the seed light L1, as described above. Therefore, the relative position of the first laser medium 12 and the second laser medium 22 is also the same for the excitation light L2.

The holder 11 integrally holds the first laser medium 12 and the second laser medium 22 so that the relative position of the first laser medium 12 and the second laser medium 22 described above is maintained. More specifically, the holder 11 includes a placement portion 11a in which the first laser medium 12 and the second laser medium 22 are placed on a placement surface 11s that is along an optical path of the seed light L1, and a plurality of holding portions 11b that are provided integrally with the placement portion 11a to protrude from the placement surface 11s and hold the first laser medium 12 and the second laser medium 22 so that the relative position is maintained.

Here, the first laser medium 12 and the second laser medium 22 are held by the heat sinks 14 and 24 being held by the pair of holding portions 11b disposed to face each other along the placement surface 11s. The holder 11 is made of, for example, a material such as a metal such as stainless steel, glass, or a resin, and is made of a material having a high heat resistance. Further, the holder 11 is formed, for example, by shaving from a single block. Accordingly, integration of the placement portion 11a and the holding portion 11b is ensured.

Next, an overview of an operation and effects of the laser device 1 will be described. In the laser device 1, the first laser medium 12 and the second laser medium 22 that receive the input of the excitation light L2 and amplify the seed light L1 are each cooled by the cooling unit 30. Therefore, gain characteristics can be improved. On the other hand, the cooling unit 30 uses change in volume of the refrigerant. Therefore, there is concern that the first laser medium 12 and the second laser medium 22 may vibrate due to vibration due to the change in volume of the refrigerant.

On the other hand, in the laser device 1, the first laser medium 12 and the second laser medium 22 are integrally held by the holder 11 so that relative positions of the mirrors M1 and M2 are maintained. Therefore, the vibration of the first laser medium 12 and the vibration of the second laser medium 22, including directions or phases thereof, are synchronized. As a result, a displacement of the incidence angle and the reflection angle of the seed light L1 at the mirror M1 of the first laser medium 12 due to the vibration is compensated for by a displacement of the incidence angle and the reflection angle of the seed light L1 at the mirror M2 of the second laser medium 22 due to the vibration, and variations in a direction or a position of the seed light L1 output from the amplification unit 10 are suppressed. Accordingly, according to the laser device 1, degradation of accuracy of the optical path control is suppressed.

Further, in the laser device 1, the first laser medium 12 and the second laser medium 22 may be disposed such that the mirror M1 and the mirror M2 are parallel to each other. In this case, it is possible to reliably compensate for the displacement of the incidence angle and the reflection angle of the seed light L1 at the mirror M1 of the first laser medium 12 due to the vibration using the displacement of the incidence angle and the reflection angle of the seed light at the mirror M2 of the second laser medium 22 due to the vibration, and further suppress a variation in the direction or the position of the seed light L1 to be output.

Further, the laser device 1 includes the mirror 45 that reflects the seed light L1 reflected by the mirror M2 of the second laser medium 22 so that the seed light L1 is incident on the mirror M2 of the second laser medium 22 at an incidence angle equal to an angle of reflection of the seed light L1 by the mirror M2 of the second laser medium 22. Therefore, the seed light L1 passes through the first laser medium 12 and the second laser medium 22, and then, passes through the second laser medium 22 and the first laser medium 12 again at substantially the same incidence angle and reflection angle. Accordingly, it is possible to substantially eliminate the shift between the incidence position and the emission position of the seed light L1.

Further, in the laser device 1, the holder 11 includes the placement portion 11a on which the first laser medium 12 and the second laser medium 22 are placed on the placement surface 11s that is along the optical path of the seed light L1, and the holding portion 11b that is provided integrally with the placement portion 11a to protrude from the placement surface 11s and holds the first laser medium 12 and the second laser medium 22 so that the relative position is maintained. Therefore, the relative positions of the first laser medium 12 and the second laser medium 22 can be reliably maintained.

Further, in the laser device 1, the first laser medium 12 and the second laser medium 22, and the cooling unit 30 are thermally connected to each other through the flexible heat conductive member 34. Therefore, vibration transmitted from the cooling unit 30 to the first laser medium 12 and the second laser medium 22 can be reduced.

Furthermore, in the laser device 1, the cooling unit 30 may be a refrigerator that cools the first laser medium 12 and the second laser medium 22 according to the periodic compression and expansion of the refrigerant. Thus, the above configuration is particularly effective when a refrigerator in which periodic vibration can be generated is used.

Figure 3:
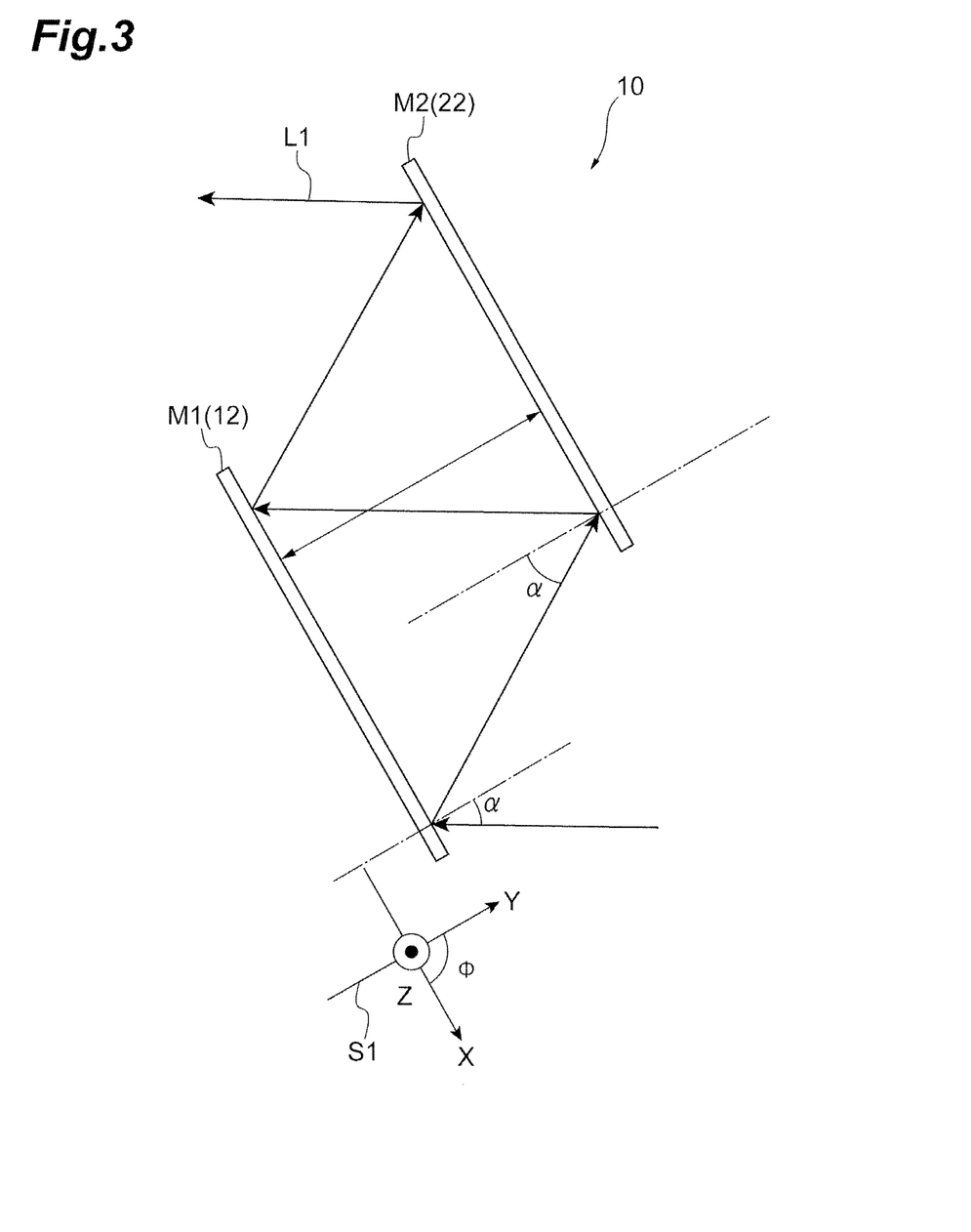
FIG. 3 is a diagram schematically illustrating a variation in position of seed light.

Next, an operation and effects of the laser device 1 will be described in detail. FIG. 3 is a diagram schematically illustrating a variation in position of the seed light when the laser medium vibrates. It should be noted that the seed light L1 will be described as an example in the following description, but the same applies to the excitation light L2 in the embodiment. As illustrated in FIG. 3, an angle α of incidence of the seed light L1 on the mirror M1 of the first laser medium 12 is set to 30°. Further, it is assumed that the seed light L1 is reflected twice by the respective mirrors M1 and M2. Components of vibrations of the first laser medium 12 (the mirror M1) and the second laser medium 22 (the mirror M2) are divided into translation components that shift parallel to an X direction, a Y direction, and a Z direction of the Cartesian coordinate system S1 in FIG. 3, a component rotating within an X-Y plane (referred to as a rotation component in the φ direction), and a component rotating within a Y-Z plane (referred to as a rotation component in the φ direction), with the angles of the mirrors M1 and M2 maintained.

In the translation components, since the X direction and the Z direction are movements within reflective surfaces of the mirrors M1 and M2, both a position and the incidence angle (a reflection angle) of the seed light L1 reflected by the mirrors M1 and M2 are not affected. Therefore, neither the position nor the direction of the seed light L1 emitted by the amplification unit 10 changes.

Figure 4:
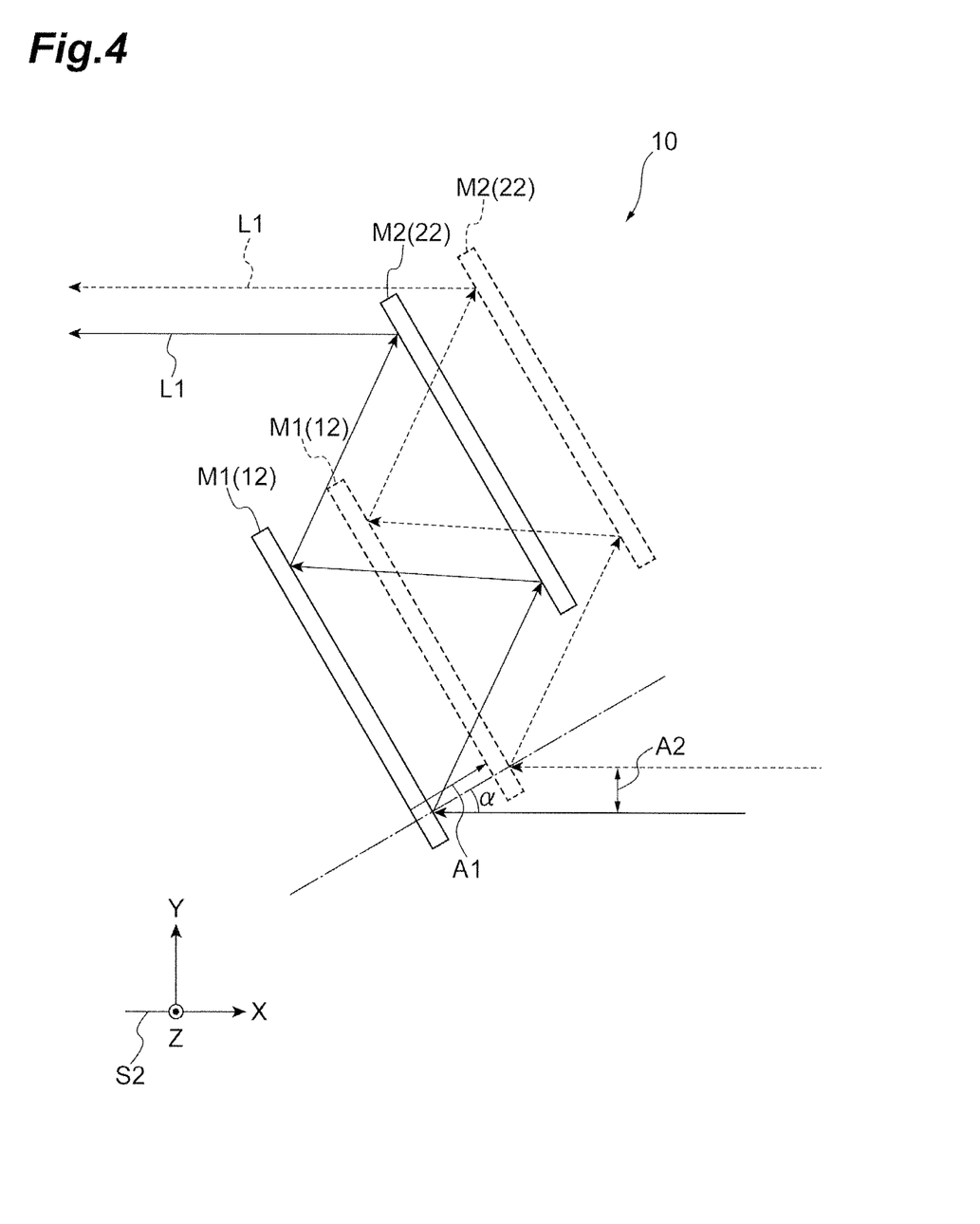
FIG. 4 is a diagram schematically illustrating a variation in position of the seed light.

FIG. 4 is a diagram schematically illustrating a variation in position of the seed light according to vibration in a Y direction. When the mirrors M1 and M2 translate in a Y direction of the Cartesian coordinate system S1 of FIG. 2, an amount A2 of shift of the emission position of the seed light L1 changes according to the incidence angle α. The amount of shift (the amount of relative shift with respect to the mirrors M1 and M2) A2 when the incidence angle α=30° is ½ of the amount of movement A1 of the mirrors M1 and M2 in the Y direction (from sin 30°=½). For example, when the amount of movement of the mirrors M1 and M2 in the Y direction is 1 mm, the amount of shift A2 of the emission position of the seed light L1 is 0.5 mm. However, since the angle of incidence (reflection angle) of the seed light L1 on the mirrors M1 and M2 does not change, a direction of emission of the seed light L1 does not change.

Figures 5A, 5B:
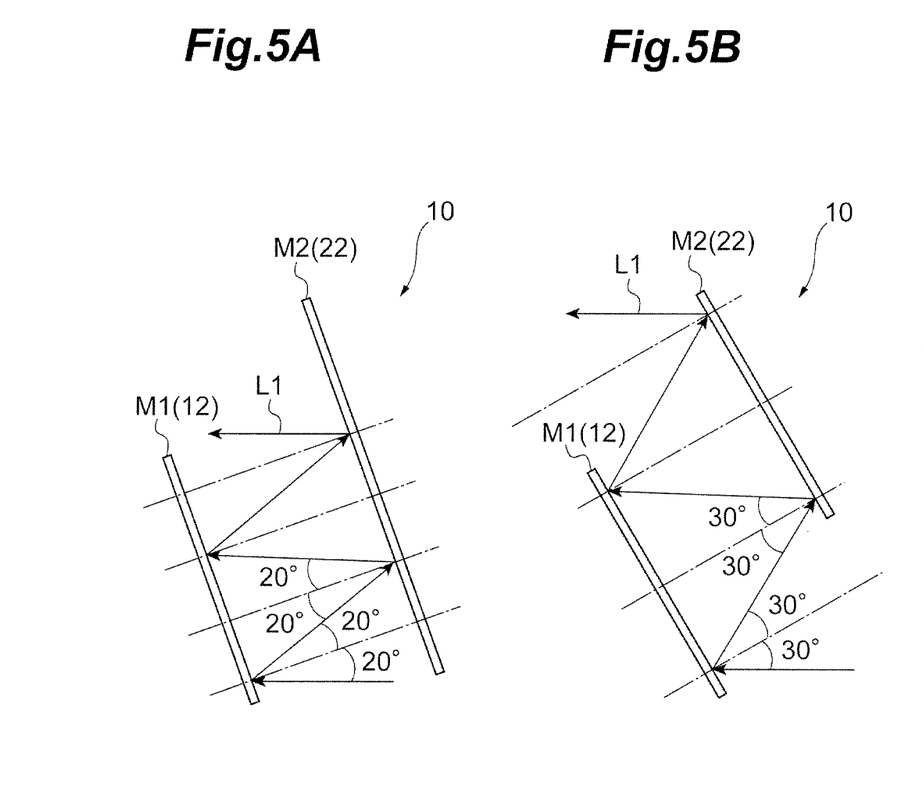
FIG. 5A is a diagram illustrating a case in which a mirror is rotated in a $\varphi$ direction.
FIG. 5B is a diagram illustrating a case in which a mirror is rotated in a $\varphi$ direction.
Figure 5C:
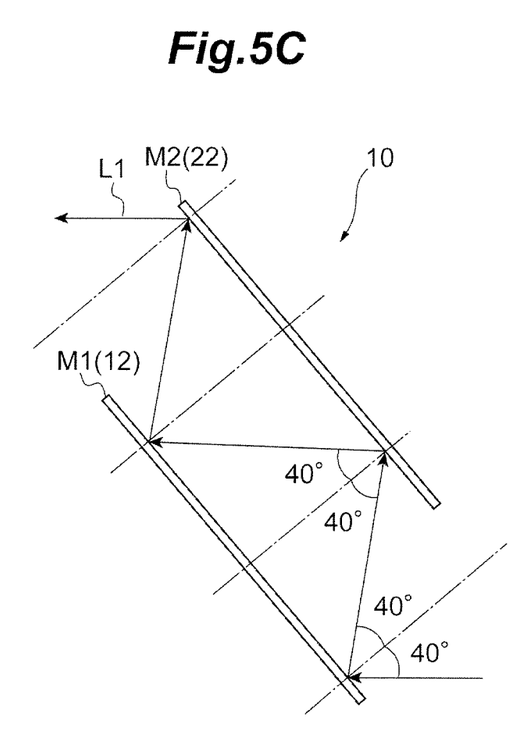
FIG. 5C is a diagram illustrating a case in which a mirror is rotated in a $\varphi$ direction.

Next, the rotation components will be described. FIGS. 5A to 5C are diagrams illustrating a case in which the mirror rotates in the ϕ direction (within the X-Y plane). When the mirrors M1 and M2 parallel to each other rotate and the incidence angle of the seed light changes, change in a reflection angle of the seed light L1 at the mirror M1 becomes the same as the change in the incidence angle according to a law of reflection. An angle when the seed light L1 reflected by the mirror M1 is incident on the mirror M2 is equal to the reflection angle at the mirror M1 because the mirrors M1 and M2 are parallel to each other. Similarly, the reflection angle of the seed light L1 at the mirror M2 is equal to as the incidence angle thereof.

Figure 6A:
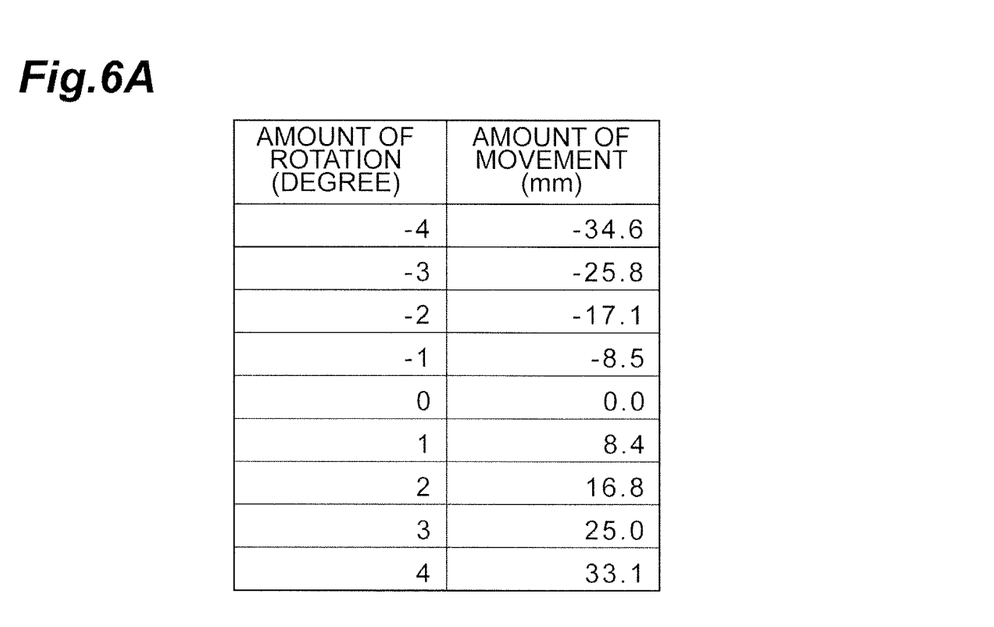
FIG. 6A is a diagram illustrating calculation results of an amount of movement of an emission position of the seed light when the mirror is rotated in the $\varphi$ direction.
Figure 6B:
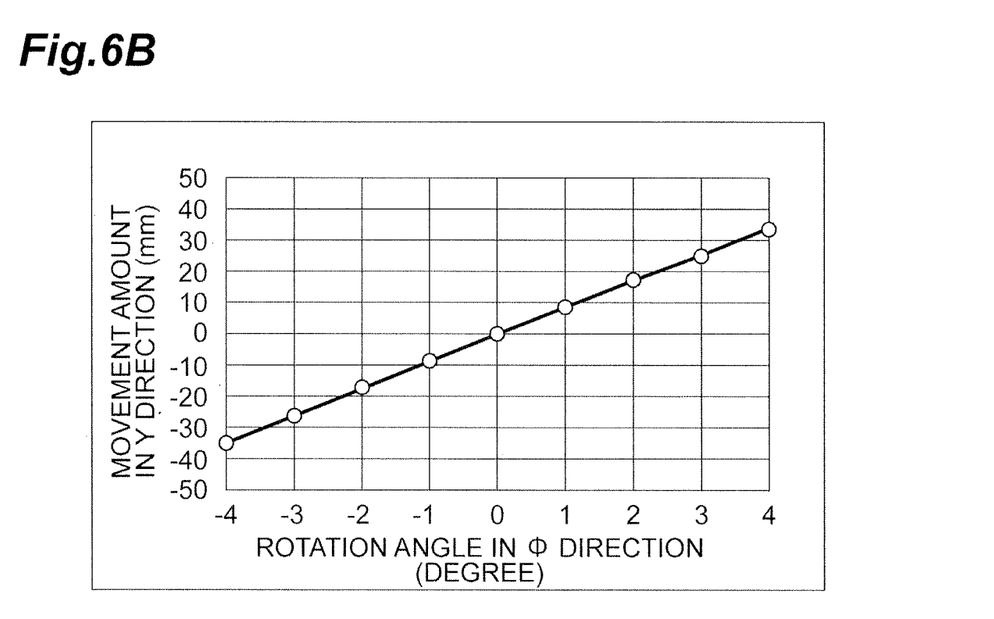
FIG. 6B is a diagram illustrating calculation results of an amount of movement of an emission position of the seed light when the mirror is rotated in the $\varphi$ direction.

As a result, the direction of the seed light L1 reflected by the mirror M2 is the same as a direction of the seed light L1 incident on the mirror M1 and is emitted. When the seed light L1 is reflected by the pair of mirrors M1 and M2 many times, the direction of the seed light L1 emitted from the mirror M2 does not change. FIGS. 6A and 6B are diagrams illustrating result of calculation of the amount of movement of the emission position of the seed light when the mirror is rotated in the ϕ direction (within the X-Y plane). In the calculation of FIGS. 6A and 6B, a distance between the mirror M1 and the mirror M2 is 136.4 mm, a thickness of the gain media 12A and 22A is 5 mm, and a refractive index of the gain media 12A and 22A is 1.82, and the incidence angle α of the seed light to the mirror M1 is 30°.

Further, the calculation result of FIGS. 6A and 6B are results when the mirrors M1 and M2 are rotated in a range of ±4° in the ϕ direction in the Cartesian coordinate system S1 of FIG. 2 from the position of incidence of the seed light L1 on the mirror M1. As illustrated in FIGS. 6A and 6B, when the mirrors M1 and M2 rotate in the ϕ direction, the emission position of the seed light L1 moves in the Y direction of a Cartesian coordinate system S2 in FIG. 4. However, when the mirrors M1 and M2 rotate at the same angle in the same direction, the emission direction of the seed light L1 does not change, as described above.

Figure 7A:
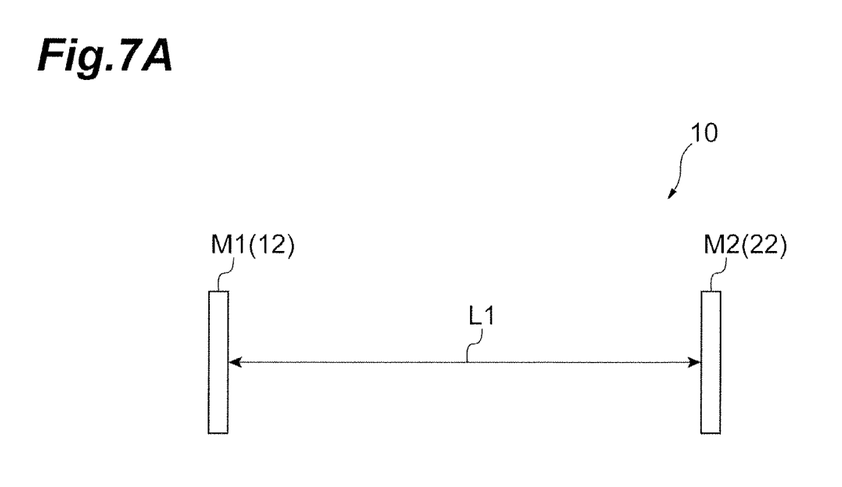
FIG. 7A is a diagram of a case in which a state in FIG. 2 is viewed in an X direction.
Figure 7B:
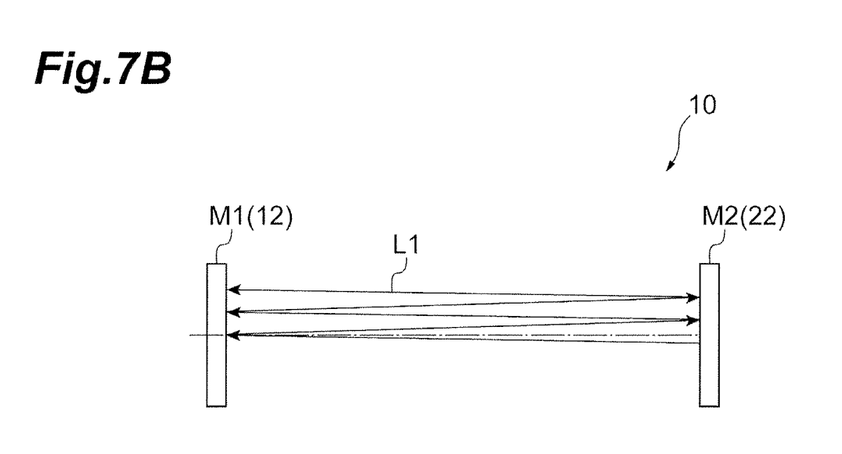
FIG. 7B is a diagram of a case in which a state in FIG. 2 is viewed in an X direction.

Next, rotation within the Y-Z plane (the θ direction) of the Cartesian coordinate system S1 in FIG. 3 will be described. FIGS. 7A and 7B are diagrams of a case in which a state in FIG. 2 is viewed in an X direction. As illustrated in FIG. 7A, when the mirrors M1 and M2 are not rotated in the ϕ direction, the seed light L1 does not move in the Z direction of the Cartesian coordinate systems S1 and S2. On the other hand, as illustrated in FIG. 7B, when the mirrors M1 and M2 are rotated in the ϕ direction, the seed light L1 is repeatedly reflected while moving in the Z direction. In addition, the seed light L1 slightly translates in a Y direction of the Cartesian coordinate system S2 of FIG. 3.

Figure 8A:
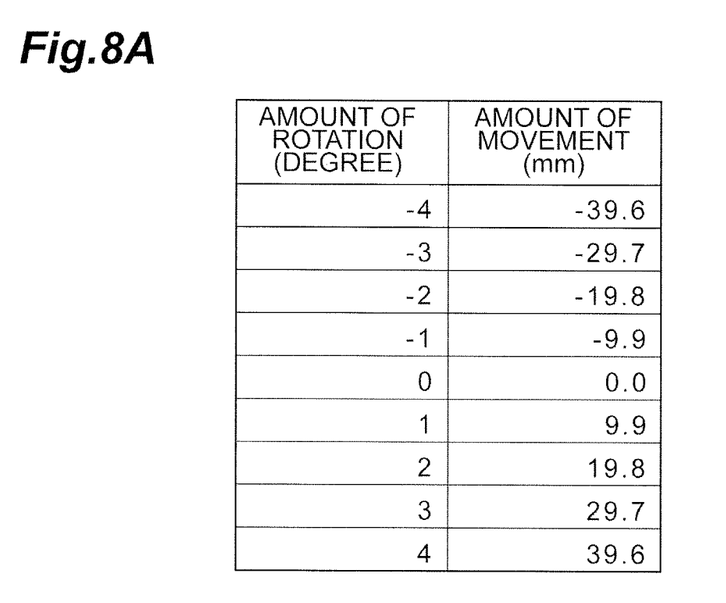
FIG. 8A is a diagram illustrating calculation results of the amount of movement of the emission position of the seed light when the mirror is rotated in the $\varphi$ direction.
Figure 8B:
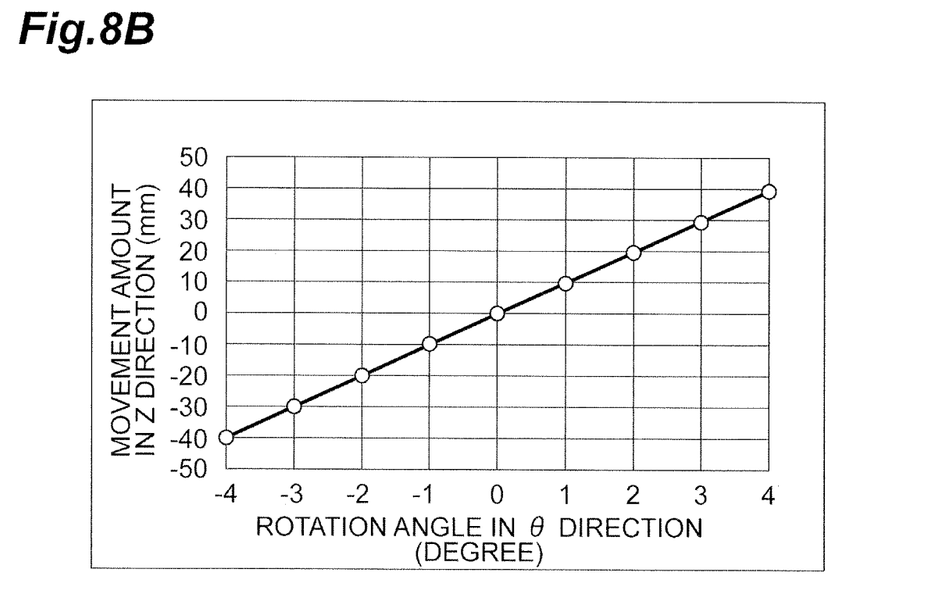
FIG. 8B is a diagram illustrating calculation results of the amount of movement of the emission position of the seed light when the mirror is rotated in the $\varphi$ direction.
Figure 9A:
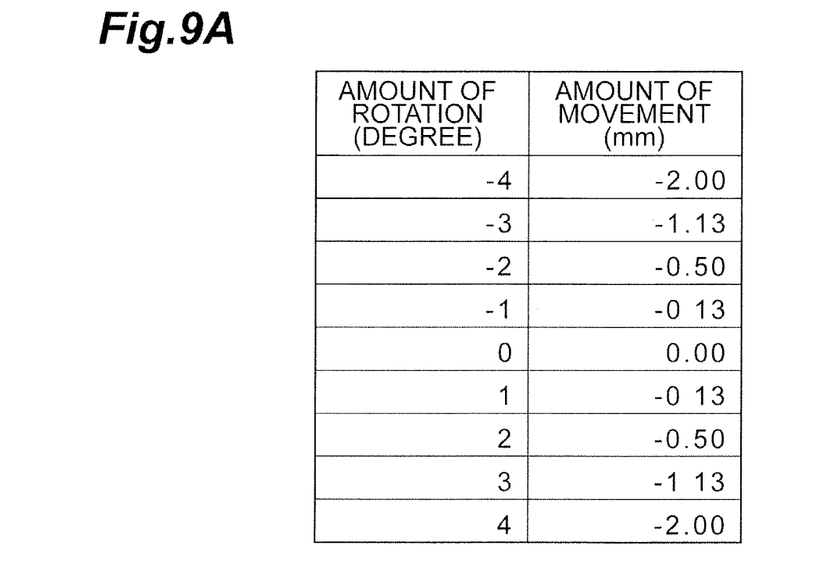
FIG. 9A is a diagram illustrating calculation results of the amount of movement of the emission position of the seed light when the mirror is rotated in the $\varphi$ direction.
Figure 9B:
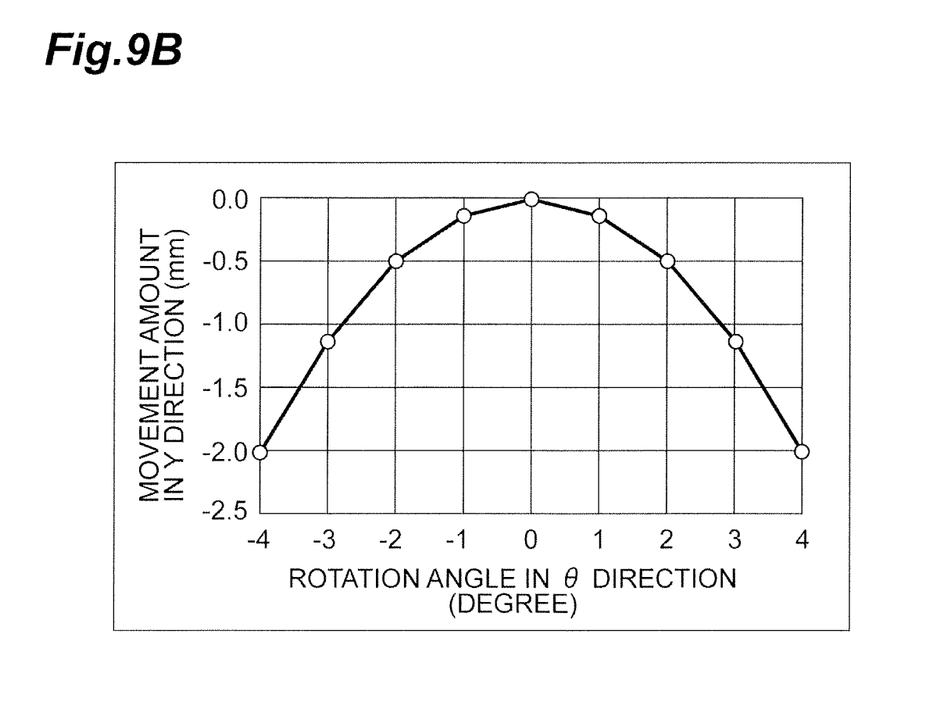
FIG. 9B is a diagram illustrating calculation results of the amount of movement of the emission position of the seed light when the mirror is rotated in the $\varphi$ direction.

FIGS. 8A, 8B, 9A, and 9B are diagrams illustrating a calculation result of the amount of movement of the emission position of the seed light when the mirror is rotated in the ϕ direction. The calculation result of FIGS. 8A and 8B are calculation results of the amount of movement of the emission position of the seed light in the Z direction when the mirrors M1 and M2 rotate in a range of ±4° in the ϕ direction from the incidence position of the seed light L1 in the mirror M1. The calculation result of FIGS. 9A and 9B are calculation results of the amount of movement of the emission position of the seed light in the Y direction (a Y direction in the Cartesian coordinate system S2) when the mirrors M1 and M2 rotate in a range of ±4° in the ϕ direction from the incidence position of the seed light L1 in the mirror M1. The amount of movement of the emission position of the seed light L1 when the mirrors M1 and M2 rotate in the ϕ direction is as illustrated in FIGS. 8A, 8B, 9A, and 9B. However, in this case, when the mirrors M1 and M2 rotate at the same angle in the same direction, the direction of emission of the seed light L1 from the amplification unit 10 does not change.

It can be seen from the above that, when the pair of mirrors M1 and M2 (the first laser medium 12 and the second laser medium 22) individually vibrate, the emission position and the direction of the seed light L1 also change, whereas when the pair of mirrors M1 and M2 (the first laser medium 12 and the second laser medium 22) vibrate in synchronization with each other (vibrate in a state in which the direction and the angle are maintained), the emission position of the seed light L1 translates, but the emission direction thereof does not change.

Next, position stabilization of the seed light L1 will be described. When the seed light L1 emitted from the amplification unit 10 is incident on the mirror 45 that is a 0° mirror and the pair of mirrors M1 and M2 vibrate while maintaining an angle therebetween (a relative position; here, parallelism), a position of incidence of the seed light L1 on the mirror 45 is shifted by the amount of movement described above. On the other hand, when angle of incidence of the seed light L1 on the mirror 45 before the vibration is 0°, an angle of incidence of the seed light L1 on the mirror 45 after the vibration is also 0°. Therefore, the seed light L1 reflected by the mirror 45 returns along an optical path along which the seed light L1 has been incident on the mirror 45 as it is.

Figure 10:
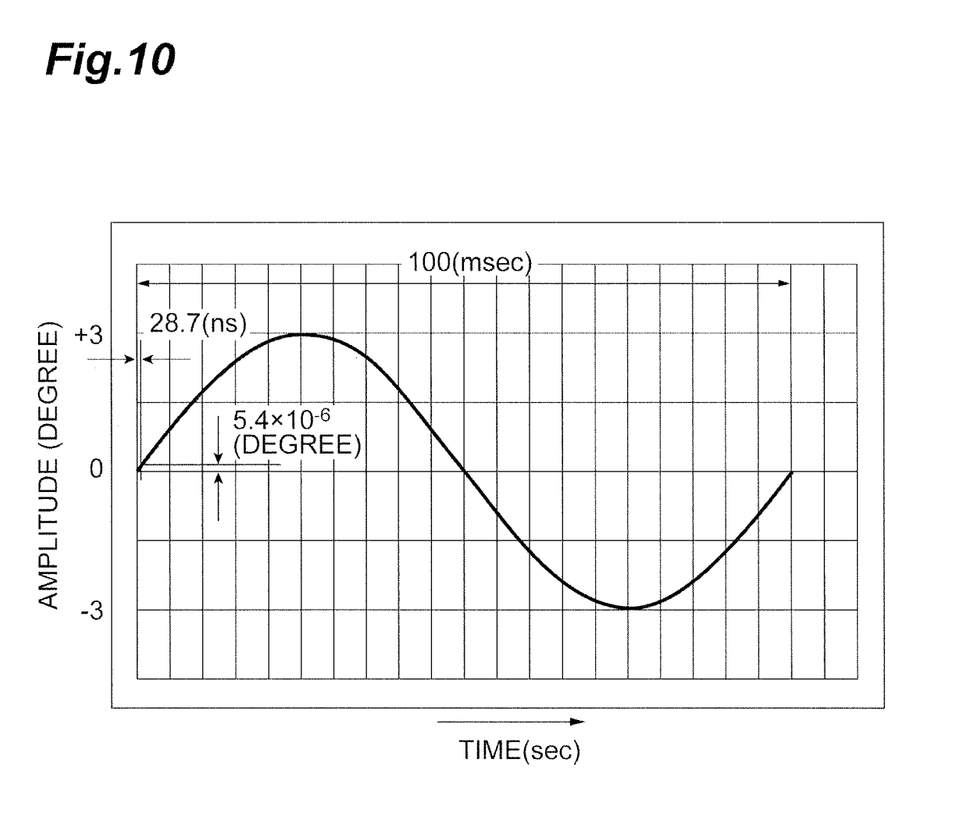
FIG. 10 is a graph illustrating position stability of the seed light.

FIG. 10 is a graph illustrating position stability of the seed light. It is assumed in FIG. 10 that vibrations of the mirrors M1 and M2 (the first laser medium 12 and the second laser medium 22) are periodic and sinusoidal. Further, it is assumed in FIG. 10 that the mirrors M1 and M2 vibrate at a frequency of 10 Hz (a period of 100 ms) and with an amplitude of ±3° in the ϕ direction. In this case, when it is assumed that a distance from the emission position of the seed light L1 in the mirror M2 to the mirror 45 is 4.3 m, a time until the seed light L1 is emitted from the mirror M2, reflected by the mirror 45, and incident on the mirror M2 again is about 28.7 ns. An amount by which the mirrors M1 and M2 vibrate and rotate during 28.7 ns is estimated to be about $5.4 \times 10^{-6}(°)$.

An amount of position shift of the amplified seed light L1 when the seed light L1 propagates through the mirrors M1 and M2 rotated by $5.4 \times 10^{-6}(°)$ and returns to the same position as the incidence position of the seed light L1 in the mirror M1 is calculated as about ±0.5 nm. When a beam diameter of the seed light L1 is 40 mm, the amount of shift is greatly reduced to 0.0000013% of the beam diameter. Referring to FIG. 6A, the amount of movement of the emission position of the seed light L1 from the mirror M2 is +25.0 mm and −25.8 mm at ±3°, whereas the amount of movement of the emission position of the seed light L1 from the mirror M1 is reduced to $1/10^7$ or less by being folded by the mirror 45 and propagating through the mirrors M2 and M1 again.

Although the case in which the mirrors M1 and M2 (the first laser medium 12 and the second laser medium 22) rotate in the φ direction has been described, the same effects can be obtained in a case in which various vibration components such as a rotation component in the θ direction or a translation component in the Y direction are combined. It is understood from the above that it is possible to provide amplified light of which the position and the direction are stabilized, even when the first laser medium 12 and the second laser medium 22 vibrate, by folding the seed light L1 emitted from the mirror M2 so that the seed light L1 returns to an original optical path using the mirror 45 that is a 0° mirror while adopting a structure for maintaining the angle (relative position and parallelism) of the pair of mirrors M1 and M2 and splitting the seed light L1 before and after amplification using the polarization beam splitter 41 or the like.

In the above embodiment, an embodiment of the laser device according to the present invention has been described. Therefore, the laser device according to the present invention is not limited to the laser device 1 described above, and various modifications are possible.

For example, the example in which the holder 11 is formed by shaving from a single block has been shown in the embodiment. However, in the holder 11, the placement portion 11a and the holding portion 11b separately formed may be mechanically fixed and integrated. Further, for example, the first laser medium 12 and the second laser medium 22 are disposed between the pair of plate members facing each other so that the mirrors M1 and M2 intersect (orthogonal to) facing surfaces of the plate members, and fixed to the plate members. That is, a holder that holds the first laser medium 12 and the second laser medium 22 so that the first laser medium 12 and the second laser medium 22 vibrate in synchronization with each other may be used as the holder 11.

Further, the mirror M1 and the mirror M2 may not be parallel to each other. Further, the first laser medium 12 and the second laser medium 22 may be disposed to entirely overlap each other when viewed in a direction intersecting (orthogonal to) the mirrors M1 and M2, or may be disposed not to overlap each other.

Furthermore, for example, gain media including Nd as an active element (for example, Nd:YAG) can also be used as the gain media 12A and 22A.

What is claimed is:

1. A laser device comprising:
   a first laser medium and a second laser medium that have a first surface and a second surface opposite to the first surface, and receive input of excitation light and seed light from the first surface side to amplify the seed light;
   a holder that holds the first laser medium and the second laser medium; and
   a pair of cooling units that cool the first laser medium and the second laser medium according to change in volume of a refrigerant,
   wherein a first mirror that reflects at least the seed light is provided on the second surface,
   the first laser medium and the second laser medium are disposed at relative positions in which the seed light reflected by the first mirror of the first laser medium is further reflected by the first mirror of the second laser medium,
   the holder integrally holds the first laser medium and the second laser medium so that the relative position is maintained,
   the first laser medium and the second laser medium are disposed such that the first mirror of the first laser medium and the first mirror of the second laser medium are parallel to each other,
   the pair of cooling units include a refrigerator that cools the first laser medium and the second laser medium according to compression and expansion of the refrigerant, and
   the first laser medium and the second laser medium are thermally connected to the pair of cooling units via a respective flexible heat conductive member.

2. The laser device according to claim 1, comprising:
   a second mirror that reflects the seed light reflected by the first mirror of the second laser medium so that the seed light is incident on the first mirror of the second laser medium at an incidence angle equal to a reflection angle of the seed light on the first mirror of the second laser medium.

3. The laser device according to claim 1, wherein the holder includes
   a placement portion in which the first laser medium and the second laser medium are placed on a placement surface that is along an optical path of the seed light; and
   a holding portion that is provided integrally with the placement portion to protrude from the placement surface, and holds the first laser medium and the second laser medium so that the relative position is maintained.

4. The laser device according to claim 1, wherein the refrigerator cools the first laser medium and the second laser medium according to periodic compression and expansion of the refrigerant.

5. The laser device according to claim 1, wherein the respective flexible heat conductive member is a mesh wire.

6. The laser device according to claim 1, wherein the respective flexible heat conductive member has one end attached to a cold head of a respective cooling unit of the pair of cooling units and another end attached to a respective heat sink provided on the respective second surface of the first laser medium and the second laser medium.

* * * * *